Feb. 24, 1953 J. R. BAUMFELD ET AL 2,629,429
FOLDING TRIPOD SEAT
Filed June 19, 1950 3 Sheets-Sheet 1
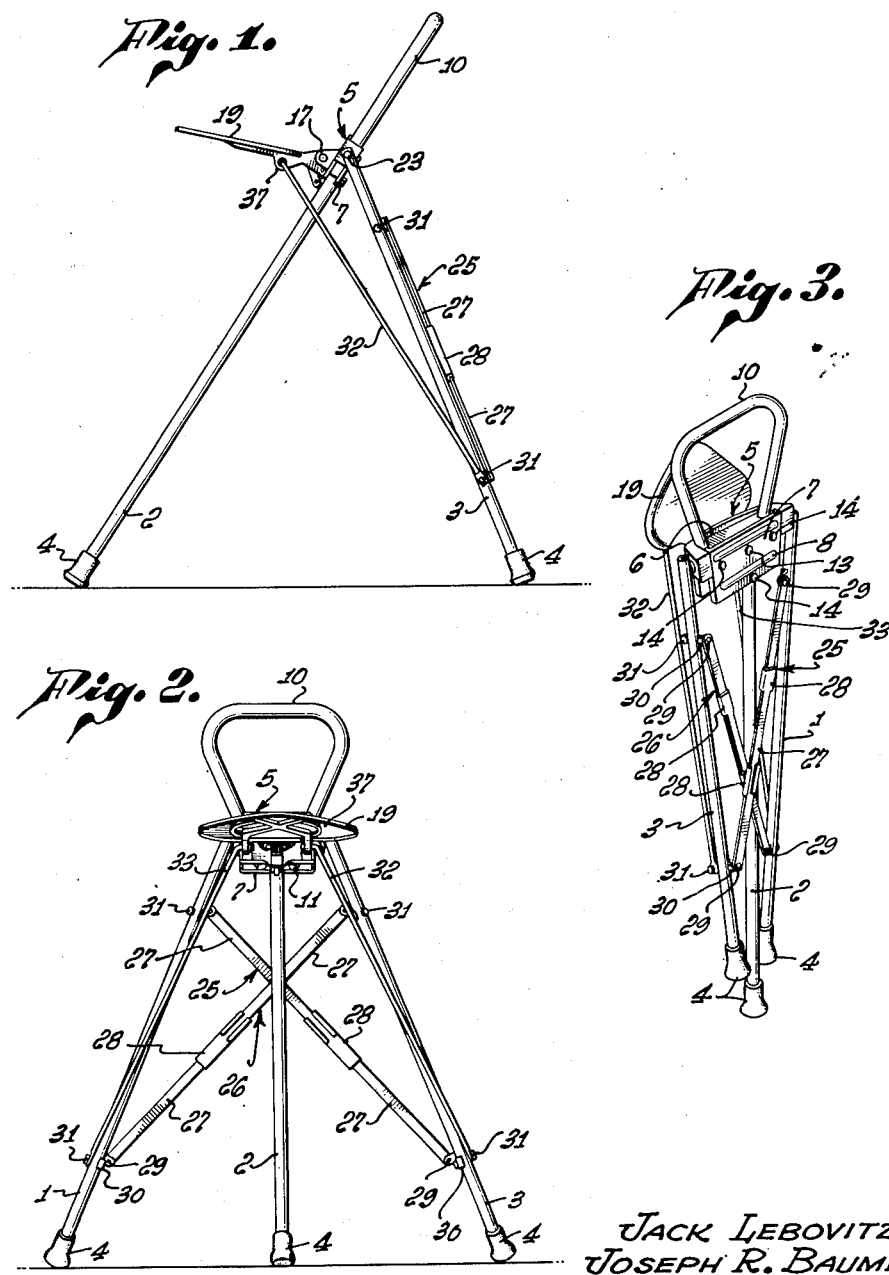
JACK LEBOVITZ,
JOSEPH R. BAUMFELD,
WILLIAM F. HOMRIGHAUSEN,
INVENTORS.
BY John Flam
ATTORNEY.

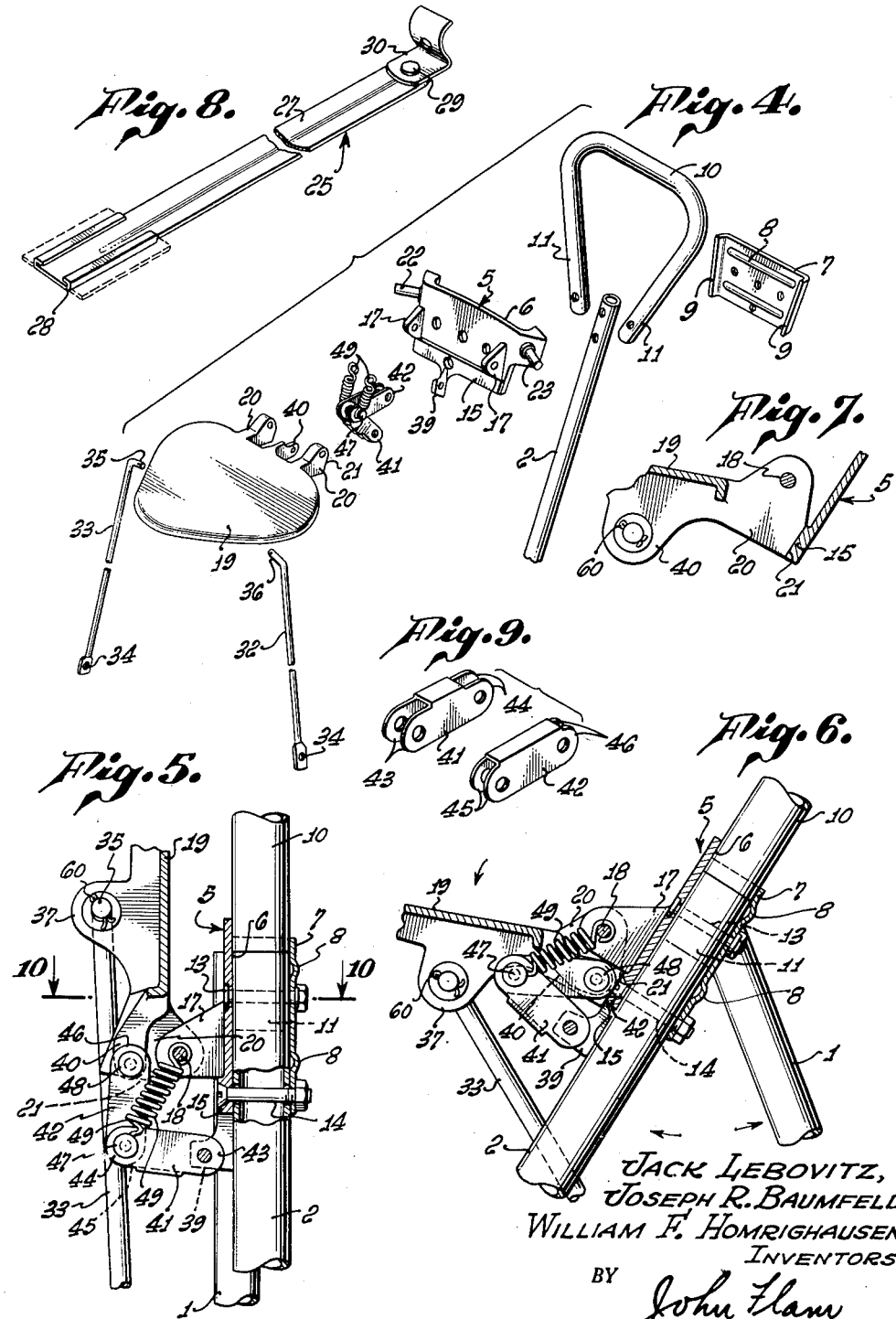

Feb. 24, 1953
J. R. BAUMFELD ET AL
2,629,429
FOLDING TRIPOD SEAT
Filed June 19, 1950
3 Sheets—Sheet 3
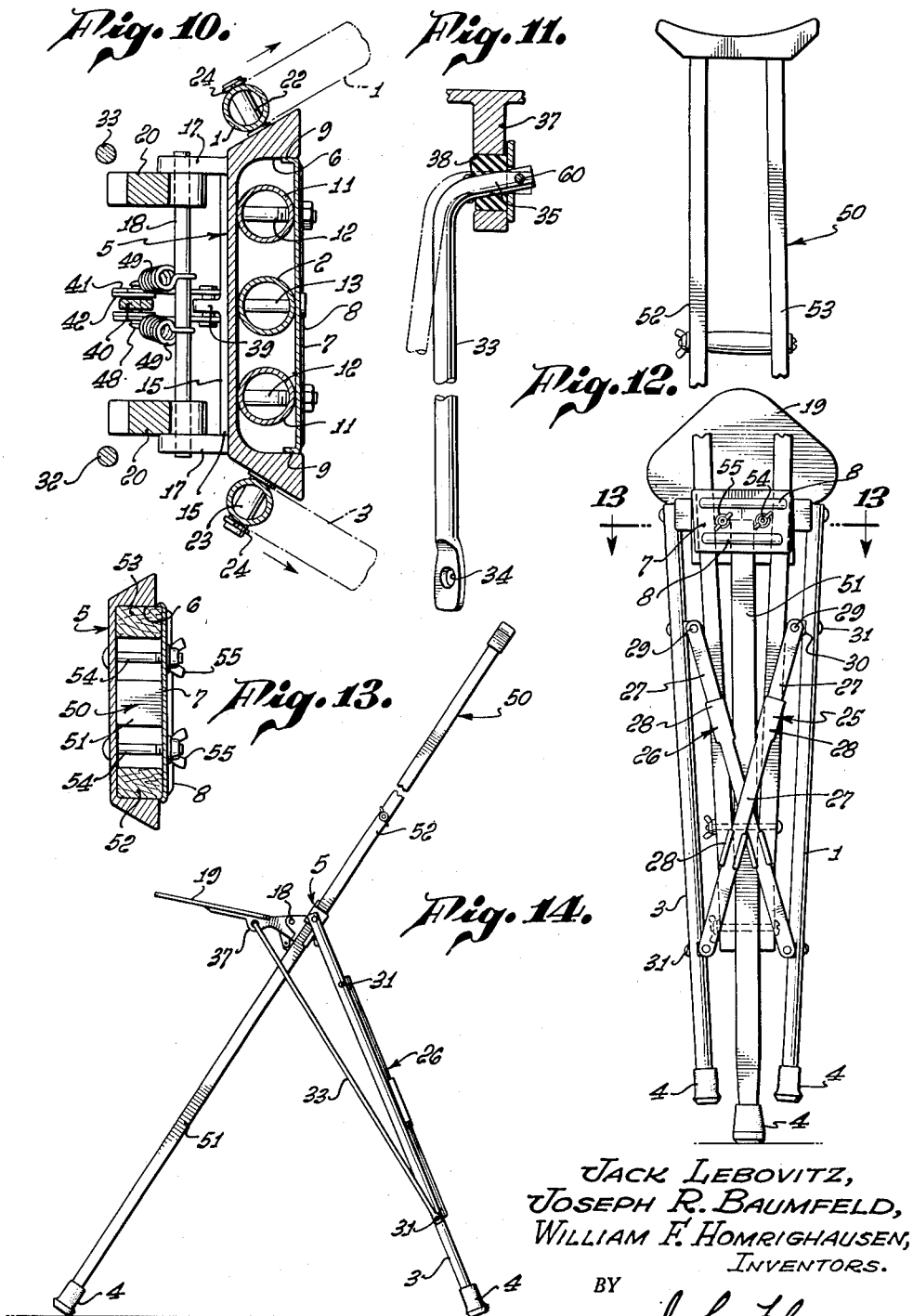
Jack Lebovitz,
Joseph R. Baumfeld,
William F. Homrighausen,
Inventors.
BY John Flam
Attorney.

Patented Feb. 24, 1953

2,629,429

UNITED STATES PATENT OFFICE 2,629,429

FOLDING TRIPOD SEAT

Joseph R. Baumfeld and Jack Lebovitz, Los Angeles, and William F. Homrighausen, Monterey Park, Calif.

Application June 19, 1950, Serial No. 168,938

6 Claims. (Cl. 155—142)

This invention relates to a folding seat.

It is one of the objects of this invention to provide a light, easily transportable seat that may conveniently be used at public gatherings, or the like. It may be incorporated in a crutch to permit the person using the crutch to be seated at will.

It is another object of this invention to provide a simple and effective bracing for the legs of the seat, and which may be readily extended and folded.

It is another object of this invention to make it possible to utilize a simple system of bracing for the folding seat.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a side elevation of a seat incorporating the invention, and shown in extended position;

Fig. 2 is a front view thereof;

Fig. 3 is a pictorial view of the seat in folded position;

Fig. 4 is an exploded perspective view of the seat portion and its major cooperating elements;

Fig. 5 is an enlarged fragmentary vertical sectional view of the seat structure shown in folded position;

Fig. 6 is a view similar to Fig. 5, but showing the seat structure in extended position;

Fig. 7 is a fragmentary detail, illustrating the bracket and seat of the seat structure shown in extended position;

Fig. 8 is a pictorial view of one portion of the extensible braces disposed between a pair of the legs of the tripod supporting structure;

Fig. 9 is a perspective view of two links used in connection with the seat structure, the links being shown in reversed position;

Fig. 10 is a sectional view, taken along a plane corresponding to line 10—10 of Fig. 5;

Fig. 11 is a fragmentary sectional view, illustrating the manner in which the bracing links for the seat may be attached thereto;

Fig. 12 is a rear view of a seat incorporated in a crutch, and shown in folded position;

Fig. 13 is a sectional view, taken along a plane corresponding to line 13—13 of Fig. 12; and Fig. 14 is a side view, similar to Fig. 1, of the crutch seat.

The seat structure shown in Figs. 1 to 11, inclusive, has the three metallic tubular legs 1, 2, and 3 (Figs. 1, 2, 3, and 4). The ends of these tubular legs may be provided with the usual rubber caps 4.

A bracket member 5, preferably made as a die casting, is firmly attached to the central leg 2 (Figs. 4 and 10). Bracket 5 has a rear recess 6 in which leg 2 is accommodated. For firmly holding the leg in place, a clamping plate 7, formed of sheet metal, is provided. It has the ribs 8 therein for strengthening it. This clamping plate 7 has inwardly turned edges 9 fitting within the walls of recess 6. A handle 10, formed of a bent tube, has its extremities 11 accommodated in the bracket 5, and is also firmly held by the clamp.

The clamping plate 7 is urged to clamping position by the aid of a pair of through bolts 12, passing through appropriate apertures in the extremities 11 and through apertures in the bracket 5 and clamping plate 7. A rivet 13 may be used to hold the upper portion of the central leg 2 in position with respect to the bracket 5 and clamping plate 7. A through bolt 14 (Figs. 5 and 6) is disposed below the rivet 13 and passes through the lower thickened rib portion 15 of the bracket 5 and through the clamping plate 7.

The bracket 5 is provided with a pair of ears 17 (Figs. 4, 5, and 10). A pivot pin 18 is accommodated in these ears, and serves pivotally to support the seat member 19. The pin 18 may be upset at its ends to prevent removal. Seat member 19 is conveniently formed as a die casting. It has rearwardly extending ears, or lugs 20, through which the pivot pin 18 passes. As shown most clearly in Fig. 7, in the extended position the rear flat surfaces 21 of these ears are in contact with the upper surface of the rib 15 formed at the lower portion of the bracket 5.

The side legs 1 and 3 are pivotally mounted upon the pins 22 and 23 (Figs. 1, 4, and 10). These pins are firmly attached into the slanting end faces of the bracket 5, and have axes that are divergent toward the front of the seat 19. Accordingly, when the legs 1 and 3 are in the extended position, as illustrated in the dotted lines in Fig. 10, they diverge toward the rear.

These legs 1 and 3 are held against removal with respect to their pins 22 and 23, as by the aid of spring key rings 24.

In order to brace these legs 1 and 3, cross braces 25 and 26 (Figs. 2 and 3) are provided. These cross bars are extensible, as indicated in Fig. 2, but are collapsible when the legs 1 and 3 are folded forwardly with respect to the seat 19 (Fig. 3).

Each of the brace rods 25, 26 is formed of a pair of telescoping elements, one of which elements 27 is shown in Fig. 8. These elements are preferably made of sheet metal, appropriately ribbed to lend the structure rigidity. Each of them is provided with a rectangular guide 28, as by turning the edges of the sheet metal upwardly and inwardly to form a narrow passage. This guide is formed at one extremity of the member 27 and embraces the corresponding telescoping member, to form a collapsible bar. In the fully extended position shown in Fig. 2, the guides 28 of the upper sections are abutted against the guides on the lower sections of the arms. In this way, there is a limit to the extensibility of these arms and, consequently, to the spread of legs 1 and 3.

Furthermore, the extremities of the telescoping braces 25 and 26 are pivoted, as by the hinge pins 29, on the brackets 30. These brackets are fastened to the legs 1 and 3, as by the aid of bolts 31. The axes of the pins 29 are perpendicular to the center line of the tubular legs 1 and 3. Accordingly, as the legs 1 and 3 are spread to the extended position of Fig. 2, the cross braces 25 and 26 remain in substantially the same plane with respect to each other.

A pair of rods 32 and 33 (Figs. 1, 2, 3, and 11) is pivoted to the seat 19. The lower ends of these rods 32 and 33 are pivoted conveniently upon the lower bolts 31 that serve to attach the brackets 30 to the legs 1 and 3. For this purpose, the rods 32 and 33 are flattened at their ends, and each is provided with the through aperture 34. The bolts 31 pass through these apertures. These bolts have axes respectively parallel to pins 22 and 23. The rods 32 and 33 operate to extend the legs 1 and 3 when the seat 19 is moved to open position, and to bring these legs together when the seat 19 is folded.

The upper ends of each of these rods 32 and 33 are bent to form the pivoted portions 35 and 36. These pivoted portions extend into the ears 37 formed integrally with the seat 19. Cotter pins 60 pass through these portions to restrain them against removal (Figs. 7 and 11). Since there is a right- and left-hand side of the seat, the rods 32 and 33 are also right- and left-handed. Furthermore, as shown most clearly in Fig. 11, a rubber sleeve 38 surrounds the extension 36, and is held within the ear 37. As the structure is folded by moving the legs 1 and 3 together, the rods 32 and 33 also approach each other; but the axis of the bent portion 36 changes from the horizontal (Fig. 2) to an axis substantially parallel to the axis of the pins 22, as shown in full lines in Fig. 11. By the aid of the rubber sleeve or bushing 38, this variation in the direction of the axes of rods 32 and 33 is rendered possible.

In the extended position, therefore, the braces 25 and 26 limit the spreading movement of the legs 1 and 3. The ears 20 at the rear of the seat 19 are firmly seated against the raised rib 15, and the rods 32 and 33 further help to maintain the seat in the rigid position.

Means are provided to restrain the seat resiliently either in the folded or extended position. For this purpose, the bracket 5 carries central apertured ear 39 (Figs. 4, 5, and 6), and at the rear of the seat there is a corresponding apertured ear 40. Arranged between these two ears are the links 41 and 42. These links are formed of thin sheet metal bent to provide the end ears 43, 44, 45, and 46. As shown in the bottom view of these links in Fig. 9, these ears extend substantially beyond the main body portions of the links to permit substantial relative angular movement between them. The ears 45 fit between the ears 43, and the pin 47 extends through both sets of ears. The ears 46 are pivotally joined to the ear 40, as by the pin 48; and, similarly, the ears 44 are pivotally joined to the ear 39 on bracket 5.

The pin 47 is extended beyond the link 41 to provide an anchor for a pair of tension springs 49. The other ends of the tension springs are anchored to the through pivot pin 18.

In the folded position of Fig. 5, the springs 49 exert a slight tension, urging the seat 19 to folded position. On the other hand, in the extended position of Fig. 6, the springs 49 tend to pull the seat 19 downwardly, or in a counterclockwise direction. This change in the force of the springs 49 is due to the passage of the axis of pin 48 from one side to the other of the spring 49. In the folded position of Fig. 5, the tension of springs 49 is to the right of the axis of spring 48. However, as the seat 19 is moved to the extended position of Fig. 6, the springs 49 exert a force in the opposite direction from that of Fig. 5 with relation to the axis of pin 48.

In the folded position of Fig. 3, the device can be carried by aid of the handle 16. The device, however, can be very quickly extended to the position of Fig. 1.

In Figs. 12, 13, and 14, substantially the same structure is utilized in connection with a crutch structure 59. The center leg extension 51 of the crutch 50 in this case is clamped to a bracket 5 by the clamping plate 7 (Fig. 13). The side braces 52 and 53 of the crutch structure are also clamped in the same manner. In the present instance, the clamping screws 54 are provided with the wing nuts 55 to make it possible readily to remove and replace the seat attached on the crutch 50. The crutch itself is substituted for the handle 10 in the first form described. In all other respects, the mode of use and operation of the device are the same as in the form shown in Figs. 1 to 11. In the extended position of Fig. 14, the lower end of the central leg 51 of the crutch forms the center of the tripod structure.

The inventor claims:

1. In a folding seat structure: a plate structure; a seat pivotally mounted on the plate structure; a pair of side legs disposed respectively on opposite sides of the seat, and pivotally mounted on the plate structure, the pivotal axes of the legs being divergent toward the front of the seat; said seat having a rear projection providing a surface abutting the plate structure when the seat is extended; collapsible cross braces connecting the legs; and an intermediate leg mounted on the plate.

2. In a folding seat structure: a plate structure; a seat pivotally mounted on the plate structure; a pair of side legs disposed respectively on opposite sides of the seat, and pivotally mounted on the plate structure, the pivotal axes of the legs being divergent toward the front of the seat; collapsible bracing between the legs; an intermediate leg rigidly mounted on the plates; a pair of rods, pivotally joined at their lower ends respectively to the side legs on axes parallel to the respective axes of the legs; said seat having pivot ears extending below the seat; said rods having bent ends extending into the ears; and resilient bushings around the bent ends and located in said ears.

3. In a folding seat structure: a plate structure; a seat pivotally mounted on the plate structure; a pair of side legs disposed respectively on opposite sides of the seat, and pivotally mounted on the plate structure, the pivotal axes of the legs being divergent toward the front of the seat; said seat having a rear projection providing a surface abutting the plate structure when the seat is extended; collapsible cross braces connecting the legs; an intermediate leg mounted on the plate and a handle mounted on the plate and extending above the seat.

4. In a folding seat structure: a plate structure; a seat pivotally mounted on the plate structure; a pair of side legs disposed respectively on opposite sides of the seat, and pivotally mounted on the plate structure, the pivotal axes of the legs being divergent toward the front of the seat; said seat having a rear projection providing a surface abutting the plate structure when the seat is extended; collapsible cross braces connecting the legs; and means for clamping the plate to an intermediate leg.

5. In a folding seat structure: a bracket; a seat pivotally mounted on the bracket; a pair of ears respectively carried by the bracket and the seat; a pair of pivotally joined links connecting the ears; and a coil spring having one end extending from the joint between the links and anchored to the links at said joints; the other end of the spring being joined to a point such that the axis of the seat ear passes from one side of the longitudinal axis of the spring to the other side when the seat is extended and folded.

6. In a folding seat structure: a bracket; a seat; means forming a pivotal connection between the seat and the bracket; said means including a rod having a free portion; a pair of pivotally joined links, the free ends of the links being pivotally joined respectively to the seat and to the bracket; and a tension spring extending between the rod and a point between the links; the pivot for the link joining the seat passing from one side to the other of the rod when the seat is extended and folded, whereby the spring resiliently urges the seat to either position.

JOSEPH R. BAUMFELD.
JACK LEBOVITZ.
WILLIAM F. HOMRIGHAUSEN.

REFERENCES CITED

The following references are of record in the file of this patent:

UNITED STATES PATENTS

| Number | Name | Date |
|---|---|---|
| 651,917 | Bolton | June 17, 1900 |
| 2,380,437 | Homrighausen | July 31, 1945 |